United States Patent [19]
Petrus

[11] 3,880,536
[45] Apr. 29, 1975

[54] HUB CONSTRUCTION
[75] Inventor: Stephen Petrus, Cleveland, Ohio
[73] Assignee: Eaton Corporation, Cleveland, Ohio
[22] Filed: Mar. 18, 1974
[21] Appl. No.: 451,941

[52] U.S. Cl. .................. 403/361; 16/121; 24/216;
74/553; 292/349; 292/353; 403/373;
403/375; 403/383
[51] Int. Cl. .............................................. E05b 3/00
[58] Field of Search .......... 403/361, 374, 383, 375;
292/349, 353; 24/216, 217; 16/121, DIG. 19;
74/553

[56]     References Cited
UNITED STATES PATENTS
2,492,113    12/1949    Rees ................................... 24/217

2,838,820    6/1958    Hakanson ............................. 24/216
3,188,124    6/1965    Pestka et al. ........................ 403/383
3,697,252    7/1972    Howie, Jr. ........................... 403/361

*Primary Examiner*—Werner H. Schroeder
*Assistant Examiner*—Conrad L. Berman
*Attorney, Agent, or Firm*—Teagno & Toddy

[57]     ABSTRACT

A hub is constructed to be frictionally held on a shaft upon insertion of the shaft into an opening in the hub by a retainer means. The retainer means includes a series of deflectable resilient fingers which resiliently yield upon insertion of the shaft into the stem and which apply retaining forces to the shaft, which forces act in substantially four directions.

2 Claims, 6 Drawing Figures

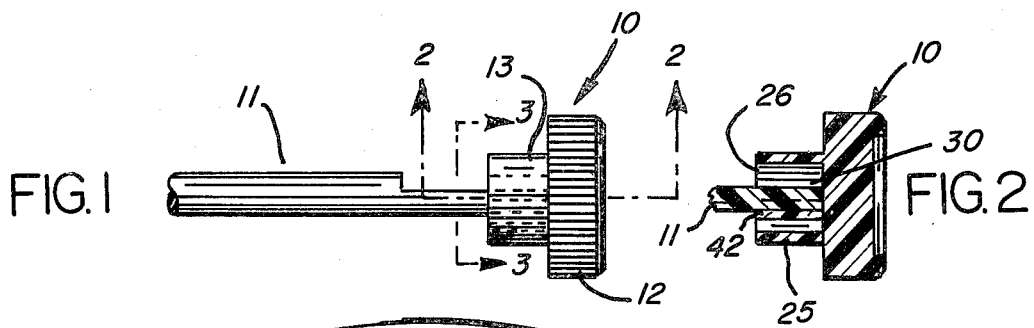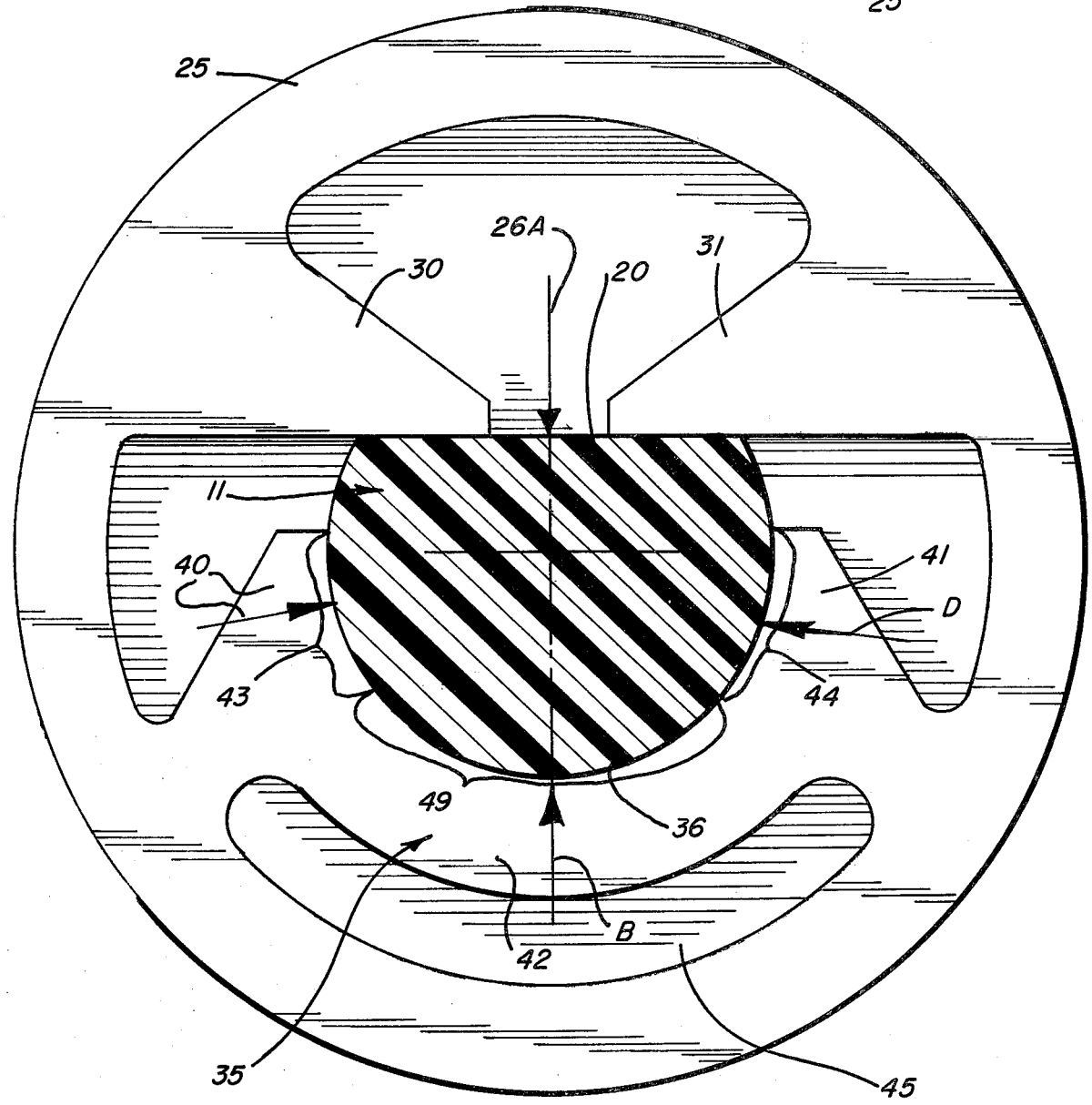

HUB CONSTRUCTION

BACKGROUND OF THE INVENTION

The present invention is directed to a hub construction for use in frictionally engaging a shaft upon insertion of the shaft into the hub. The hub construction may be associated with a variety of devices, such as fans, pulleys, reels, dials, etc., for frictionally attaching such devices to a shaft. Such hub constructions are commonly used with control knobs to attach a knob to a shaft.

The hub construction of the present invention relates generally to the type which is of a one-piece construction made of a suitable plastic material, such as nylon or the like. In general, a hub construction for retaining a device, such as a knob, on a shaft is known. Such known hub constructions include some means to frictionally engage the shaft as the shaft is inserted into the hub. Typical prior art patents which disclose such structures are shown in U.S. Pat. Nos. 3,679,252 and 3,188,124.

SUMMARY OF THE PRESENT INVENTION

The present invention is directed to a hub construction which is adapted to be retained on a control shaft. The hub is frictionally retained on the shaft in response to insertion of the shaft into an opening in the hub.

To effect retention of the hub and the shaft in proper relative relationship, the hub is provided with a retaining means. The retaining means is constructed so as to apply retaining compressive forces on different peripheral portions of the shaft. The retaining means applies forces in substantially four different directions to the shaft and thus is extremely effective.

More specifically and in a preferred embodiment, the retaining means, which is formed integrally with the hub, includes a pair of deflectable resilient elements which engage a flat portion of the generally "D" shaped shaft and which apply a resultant force on the shaft in one direction. A curved portion of the shaft is cradled in a curved seat of the hub and the central area of the curved seat applies a force on a first curved surface portion of the shaft which is equal in magnitude and opposite in direction to the force which is applied by the deflectable elements engaging the flat on the shaft. Also, a second paira of elements are provided integral with the hub and which are deflectable in opposite directions away from other curved peripheral portions of the shaft upon insertion of the shaft into the hub and which portions yieldably engage and apply a force against those shaft portions.

As a result of the afore-mentioned construction, the shaft is rigidly and fixedly secured in the hub without the need for retaining clamps or other such devices. In fact, the securement of the shaft in the hub is quite effective because of the fact that retaining forces are, in effect, applied to the shaft in four different directions.

DESCRIPTION OF THE FIGURES

Further objects and features of the present invention will be apparent to those skilled in the art to which it relates from the following detailed description of preferred embodiments thereof, which description is made with reference to the accompanying drawings in which:

FIG. 1 is a side elevational view of a knob embodying the present invention with a control shaft located therein;

FIG. 2 is an axial sectional view of the knob shown in FIG. 1;

FIG. 3 is an end view of the knob shown in FIG. 1 taken approximately along the line 3—3 of FIG. 1;

DESCRIPTION OF THE PREFERRED EMBODIMENT

Figure 4:
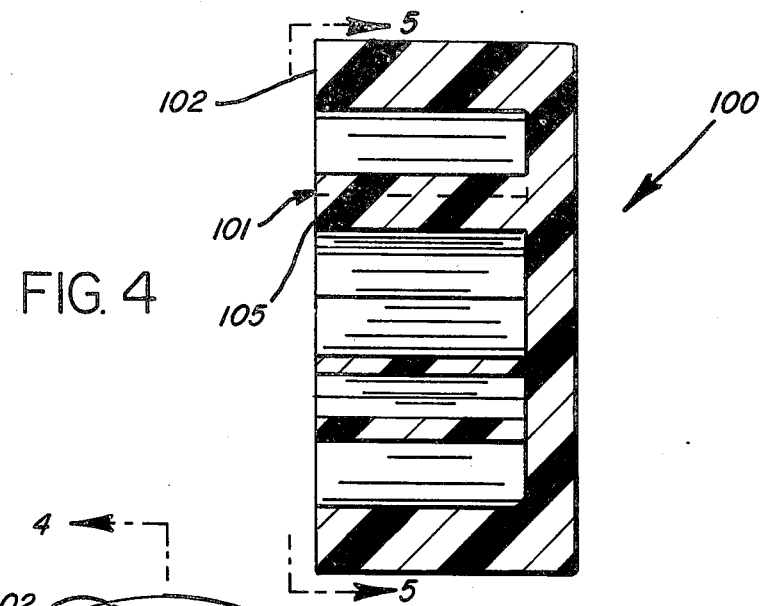
FIG. 4 is an axial sectional view of a knob embodying the present invention but of a modified construction.

As noted hereinabove, the present invention relates to a hub construction for attachment with a shaft. The hub construction is a one-piece plastic part and is constructed so as to be rigidly attached to the shaft upon insertion of the shaft into a hollow tubular portion of the hub. The hub construction, as noted above, may be used in association with a variety of different devices, and is shown herein as preferably embodied in a one-piece knob 10 for securing the knob on a shaft 11 to be turned by the knob.

The knob 10 includes a manually engageable head portion 12 which is manually engaged and turned in order to effect rotation of the knob and control shaft 11 therewith. Knurls, pointers, dials, or the like, may be formed on the outer periphery of the head portion to facilitate gripping for rotating the knob and to provide functional adjustment. The manually engageable head portion 12 of the knob is connected or formed integrally with a hub construction 13 which projects from the head portion 12. The hub construction 13 is of tubular form and the control shaft 11 is secured therein.

The knob 10 including the portions 12, 13 thereof are formed as an integral one-piece construction. These portions are formed of a plastic material, such as nylon or the like, as is well known. Of course, the specific material of which these parts are made may vary as long as the properties necessary to the structure operating as described below are retained.

The present invention is specifically directed to the construction of the hub for securing the knob 10 and control shaft 11 togeteer. Specifically, the hub 13 of the knob 10 is provided with a retainer structure for retaining the shaft 11 and knob 10 in an assembled relationship. The retainer structure functions to frictionally grip the shaft 11 upon insertion of the shaft into the hub 13 of the knob 10.

As best shown in FIG. 3, the shaft is provided with a flat, peripheral surface portion, designated 20, and a curved, peripheral surface portion, which is a portion of a circle in cross section. These shaft portions extend axially for a distance at least equal to the axial length of the hub portion 13. Shafts of this type are well known and are commonly referred to as "D" shafts.

To assemble the shaft 11 and the knob 10 together, the shaft 11 is inserted into the hub 13 and as the end of the shaft 11 is moved into the hub 13, portions of the hub are resiliently deflected and are caused to resiliently clamp against the surfaces of the shaft 11 in a compressive manner.

As best shown in FIG. 3, the hub has an outer wall 25, which is circular in cross section and defines a chamber 26. Two ribs or fingers, designated 30, 31, project from the outer wall into the chamber 26. The ribs 30, 31 engage the flat surface portion 20 of the shaft and apply a compressive force thereagainst. Located at substantially diametrically opposite locations from the fingers or ribs 30, 31 is a structure which projects from the outer surface of the hub and which structure is generally designated 35. The structure 35 defines a generally cylindrical surface 36 in which the control shaft is cradled.

The structure 35 also includes a rib or finger 40 and a generally oppositely located rib or finger 41, both of which project generally vertically, as shown in FIG. 3, from a central portion 42 of the structure 35. The fingers 40, 41 engage generally opposite surface portions, designated 43, 44, of the curved outer periphery of the shaft 11 and apply a clamping pressure to the shaft 11 in generally opposite directions. A cavity 45 is provided in the structure 35 in order to ensure uniform wall thickness for the wall 25, as is conventional in molding operations. The cavity 45 also serves to provide a degree of resiliency and flexibility to accommodate shaft tolerances.

The structure 35 including the ribs 40, 41, as well as the cavity 45 extend axially a distance substantially equal to the length of the hub. Also, the ribs 30, 31 extend axially a distance substantially equal to the length of the hub. The axial extent of these elements can be controlled to provide the desired frictional force on insertion and extraction of the shaft 11, as well as to provide sufficient area for transmitting the necessary torque between the hub 13 and the shaft 11.

From the above, it should be apparent that as the shaft 11 is inserted into the hub 13, the shaft is guided into the area between the fingers 30, 31 and the structure 35. The dimensioning of the opening between these parts is such that the shaft 11 as it is inserted tends to upwardly deflect (as shown in FIG. 3), the fingers 30, 31, so that the tendency of the fingers or ribs 30, 31 to return to their normal position causes the ribs or fingers 30, 31 to apply a resultant force, generally designated A in FIG. 3, against the flat surface 20 of the shaft 13 in a downward direction. A force B equal in magnitude and opposite in direction to the force A is applied to the curved surface portion 49 of the shaft 11 by the structure 35.

Also, not only does the shaft 11 have resultant forces A and B acting thereon, but the shaft 11 also has resultant forces, designated C and D in FIG. 3, which are applied to the surface portions 43, 44 of the shaft 11 by the resiliently deflectable fingers 40, 41. The fingers 40, 41 are also, like 30, 31, resiliently deflected by the shaft 11 being inserted therebetween and their tendency to return to their normal position causes them to apply the forces C and D to the shaft.

Lead edge chamfers to facilitate the insertion of the shaft 11 between the ribs 30, 31 and the structure 35 may be provided on either the shaft 11 or on the ribs 30, 31 and on the structure 35. Such lead edge chamfer has not been shown in the drawings.

From the above, it should be clear that the knob 10 and hub 13 are constructed so that clamping or compressive resultant forces act in compression in four directions on the control shaft 11, these forces being designated A through D. The force A acts in opposition to the force B, and likewise the forces C and D act in generally opposite directions and against generally opposite surface portions of the shaft 11. These forces provide for resiliently clamping the hub 13 on the shaft 11 in a tight frictional engagement so as to rigidly and securely connect the knob 10 to the control shaft 11 so that upon rotation of the knob 10, the control shaft 11 likewise rotates.

Figure 5:
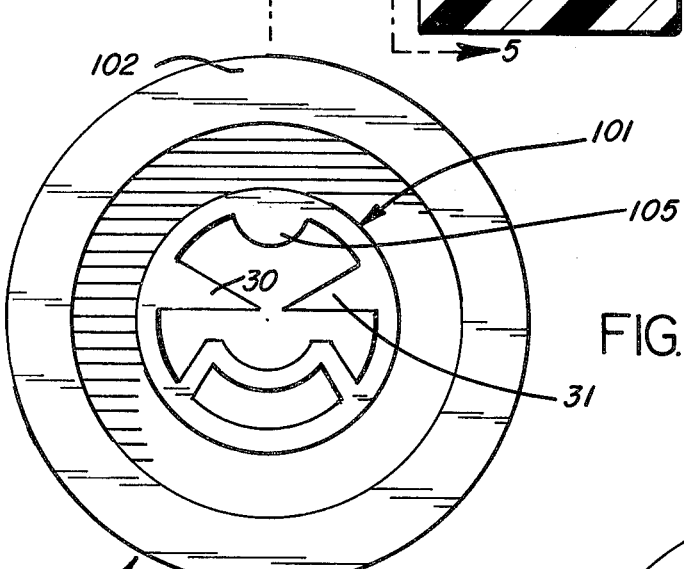
FIG. 5 is a view of the knob of FIG. 4 taken along line 5—5 thereof.

A modified embodiment of the present invention is illustrated in FIGS. 4 and 5. In FIGS. 4 and 5, a knob 100, similar in construction to the knob 10, is illustrated. In view of the specific similarities of the constructions, the details of the knob 100 will not be described, only the differences between the knob 100 and the knob 10 disclosed above will be described.

The basic difference between the knob 100 and the knob 10 centers in two areas. One difference is that the hub portion 101 of the knob 100 does not extend beyond the manually gripped portion 102 of the knob, but rather the portion 102 thereof extends outwardly over the hub portion 101. This may be termed a "recessed" hub design, in that the hub 101 does not project beyond the grippable portion 102 of the knob 100.

In addition, as shown in FIG. 5, the hub portion 101 is provided with a foolproof rib 105 which projects radially from the upper portion of the hub portion, as shown in FIG. 5, into the area between the ribs 30, 31. The foolproof rib is provided for purposes of preventing the insertion of the shaft into that area into which the foolproof rib projects.

Figure 6:
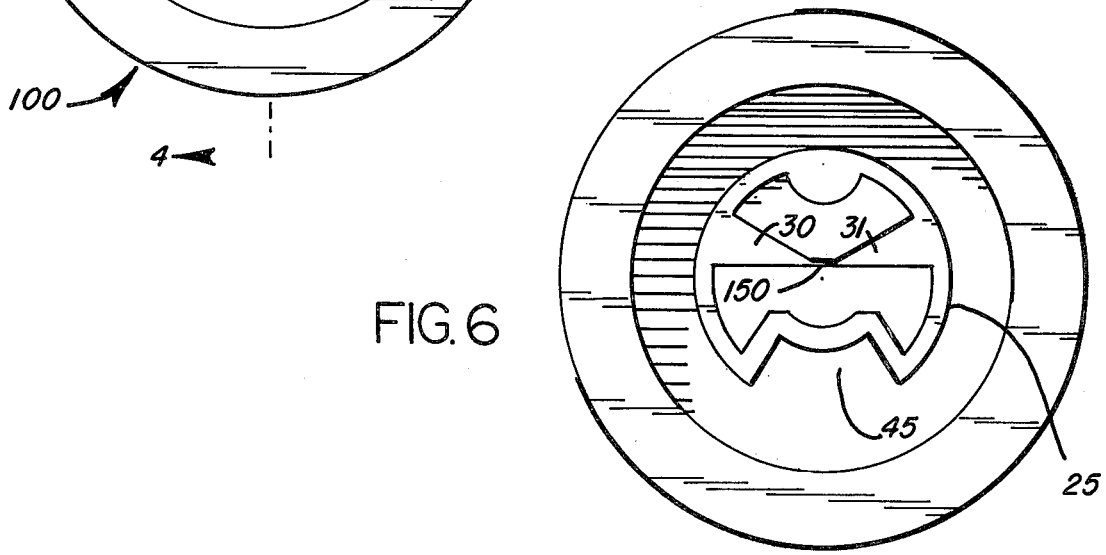
FIG. 6 is a view of another knob embodying the present invention.

A further modified embodiment of the present invention is illustrated in FIG. 6, and again the construction shown in FIG. 6 is basically similar to that shown in FIGS. 1–5. However, in the embodiment of FIG. 6, the ribs or fingers 30, 31 are modified and are joined by means of a thin plastic web 150, which web applies a force to the flat surface of the shaft which is inserted into the hub. Use of the thin plastic web is advantageous where the flat surface area of the shaft is minimal. In addition, in the embodiment shown in FIG. 6, the peripheral wall 25, or the portion thereof adjacent the release slot 45 is eliminated, which in general minimizes the hub diameter.

In addition to the above-illustrated embodiments, it should be clear that the hub construction in any of the illustrated embodiments can be provided with an opening extending completely therethrough so as to allow for adjustment of the hub along the shaft on which the hub is mounted. In this manner, whatever device is secured to the shaft by the hub, it is possible to effect adjustment of that device along the shaft by merely sliding the hub along the shaft.

Furthermore, it is possible to form the hub construction as a one-piece item and to ultrasonically weld the hub construction to a device, such as a decorative knob which is to be attached to a shaft. In this manner, the device such as the decorative knob may be secured to the shaft.

In view of the above, it should be apparent that applicant has provided an improved hub construction capable of use in a variety of different structures for securing different structures on a shaft, and it is intended to cover all of the above-described modifications thereof by the claims appended hereto.

Having described my invention, I claim:

1. A one-piece, molded, self-retaining hub for retention to a generally cross-sectionally "D" shaped shaft, said hub comprising:

a body having an axially extending opening adapted to receive the shaft;

said hub having retainer means integral therewith for retaining the shaft therein by applying retaining forces to the outer peripheral surface of the shaft;

said retainer means comprising:

a first means adapted to apply a first pair of oppositely directed resultant forces to the flat portion and a substantially opposite portion of the outer peripheral surface of the shaft in response to insertion of the shaft into said hub, said first means comprising first and second resiliently deflectable cantilevered ribs adapted to engage the flat portion of the outer peripheral surface of the shaft and a curved, deflectable rib adapted to engage the outer peripheral surface of the shaft opposite the flat portion;

a second means adapted to apply a second pair of substantially oppositely directed resultant forces to two other opposite peripheral portions of the shaft in reponse to insertion of the shaft into the said hub, the two other outer peripheral portions of the shaft each being intermediate the flat portion and the portion opposite the flat portion of the outer periphery of the shaft, said second means comprising third and forth resiliently deflectable cantilevered ribs adapted to engage the two other outer peripheral portions;

said curved rib being interposed said third and forth cantilevered ribs forming a smooth, continuous surface therewith.

2. The hub of claim 1 wherein said curved rib and said third and forth cantilevered ribs comprise an axially extending curved surface suspended in said opening by a pair of radially extending legs extending from the opposite ends of said curved surface to the inner wall of said opening, said third and forth cantilevered ribs comprising the intersections of said legs and said curved surface.

* * * * *

UNITED STATES PATENT AND TRADEMARK OFFICE
CERTIFICATE OF CORRECTION

PATENT NO. : 3,880,536
DATED : April 29, 1975
INVENTOR(S) : Stephen Petrus

It is certified that error appears in the above-identified patent and that said Letters Patent are hereby corrected as shown below:

The Title as printed is incorrect - Should read "SELF-RETAINING HUB"

Column 1, line 49: "paira" should read ---pair---.

Column 2, line 47: "togeteer" should read ---together---.

Signed and Sealed this twenty-third Day of September 1975

[SEAL]

Attest:

RUTH C. MASON
Attesting Officer

C. MARSHALL DANN
Commissioner of Patents and Trademarks